United States Patent
Engel et al.

(10) Patent No.: US 6,925,523 B2
(45) Date of Patent: Aug. 2, 2005

(54) MANAGING MONOTONICALLY INCREASING COUNTER VALUES TO MINIMIZE IMPACT ON NON-VOLATILE STORAGE

(75) Inventors: Glenn R Engel, Snohomish, WA (US); Glen L Purdy, Jr., Snohomish, WA (US)

(73) Assignee: Agilent Technologies, Inc., Palo Alto, CA (US)

(*) Notice: Subject to any disclaimer, the term of this patent is extended or adjusted under 35 U.S.C. 154(b) by 247 days.

(21) Appl. No.: 10/379,339

(22) Filed: Mar. 3, 2003

(65) Prior Publication Data

US 2004/0177213 A1 Sep. 9, 2004

(51) Int. Cl.$^7$ ............... G06F 12/00; G11C 13/00
(52) U.S. Cl. ............... 711/103; 711/100; 365/218; 365/230.01
(58) Field of Search ............... 711/100, 103, 711/154; 365/218, 230.01

(56) References Cited

U.S. PATENT DOCUMENTS

| | | | |
|---|---|---|---|
| 5,287,501 A | * | 2/1994 | Lomet ............... 707/202 |
| 5,369,757 A | * | 11/1994 | Spiro et al. ............... 714/19 |
| 5,457,658 A | * | 10/1995 | Niijima et al. ............... 365/218 |
| 5,590,298 A | * | 12/1996 | Kawamoto ............... 711/3 |
| 5,740,433 A | * | 4/1998 | Carr et al. ............... 707/202 |
| 5,978,810 A | * | 11/1999 | Mitchell et al. ............... 707/102 |
| 6,104,638 A | * | 8/2000 | Larner et al. ............... 365/185.33 |
| 6,480,970 B1 | * | 11/2002 | DeKoning et al. ............... 714/6 |

OTHER PUBLICATIONS

2002 Microchip Technology Inc.; Microchip 24AA128/24LC128/24FC128; pp. 1–28.

* cited by examiner

*Primary Examiner*—Tuan V. Thai
(74) *Attorney, Agent, or Firm*—Robert T. Martin

(57) ABSTRACT

Reducing writes to non-volatile storage in a system for tracking sequence numbers in a communications protocol. In a system which tracks sequence numbers, a sequence number base is kept in non-volatile storage. During normal operation, the value in non-volatile storage is not rewritten until it exceeds the base value in non-volatile storage plus a predetermined update constant. On startup, the sequence number is set to the value in non-volatile storage plus the predetermined update constant.

12 Claims, 3 Drawing Sheets

US 6,925,523 B2

MANAGING MONOTONICALLY INCREASING COUNTER VALUES TO MINIMIZE IMPACT ON NON-VOLATILE STORAGE

BACKGROUND OF THE INVENTION

1. Field of the Invention

The present invention pertains to the management of sequence counters used in communications protocols, and more particularly, to the management of sequence counters whose values are retained in non-volatile storage.

2. Art Background

Numerous communications protocols use sequence counters. As an example, Internet security architectures such as the IPSec suite of protocols use monotonically increasing counters to deter replay attacks, an attack where a message is captured and resent intact to the receiver with the hope that a previous action or state will be duplicated.

In such protocols using sequence counters, both the sender and receiver must maintain the last value received to use in comparison to newly received messages. When a new message is received and validated, the sequence counter value is incremented. In current implementations of such protocols, when a power failure or other unplanned restart occurs, security protocols are re-negotiated from scratch using techniques which are expensive in terms of computation and time required. After such re-negotiation, communications under the protocol proceed.

SUMMARY OF THE INVENTION

Resynchronization in communications protocols using sequence counters is simplified by retaining sequence counter values in non-volatile storage. To reduce writes to non-volatile storage, a sequence number base value is written to non-volatile storage rather than the currently active sequence value. During normal operation the system retains the current sequence number value in volatile storage and compares each incoming message value with the current volatile sequence counter. When the counter value exceeds the sequence number base value plus a predefined counter update constant, a new base value is written to non-volatile storage.

BRIEF DESCRIPTION OF THE DRAWINGS

The present invention is described with respect to particular exemplary embodiments thereof and reference is made to the drawings in which.

DETAILED DESCRIPTION

In many communications protocols such as security architectures including the IPSec suite of protocols, sequence counters are one of the methods used to validate incoming messages. As an example of such validation, a protocol checks to insure that the sequence number of the incoming message is greater than the sequence number of the last validated message. In such protocols, both the sender and receiver must maintain the last value received to use in comparison to newly received messages. When a new message is received and validated, the sequence counter value is incremented. In current implementations of such protocols, when a power failure or other unplanned restart occurs, security protocols are re-negotiated from scratch using techniques which are expensive in terms of computation and time required. After such re-negotiation, communications under the protocol proceed.

According to a first embodiment of the invention, this re-negotiation of sequence number values is simplified by preserving the sequence number values in non-volatile storage. In the event of a power failure or other system restart, sequence number values are retrieved from non-volatile memory, and communications resumed.

The form of non-volatile memory used will vary depending on the architecture of the system.

In high-performance systems, for example, sequence counter values may be maintained by writing them to battery-backed random-access memory (RAM). However, systems using lower-performance storage media such as flash memory could incur significant penalties in keeping track of sequence counter values. Writing a value, such as a sequence counter value, to a flash memory imposes a time penalty as in many flash architectures write times are dramatically longer than read times, and a large block must be written in a write cycle. Additionally, a system using flash memory would need to consider system issues such as the maximum number of lifetime write cycles allowed; flash memory devices are typically specified with a maximum number of write cycles.

Figure 1:
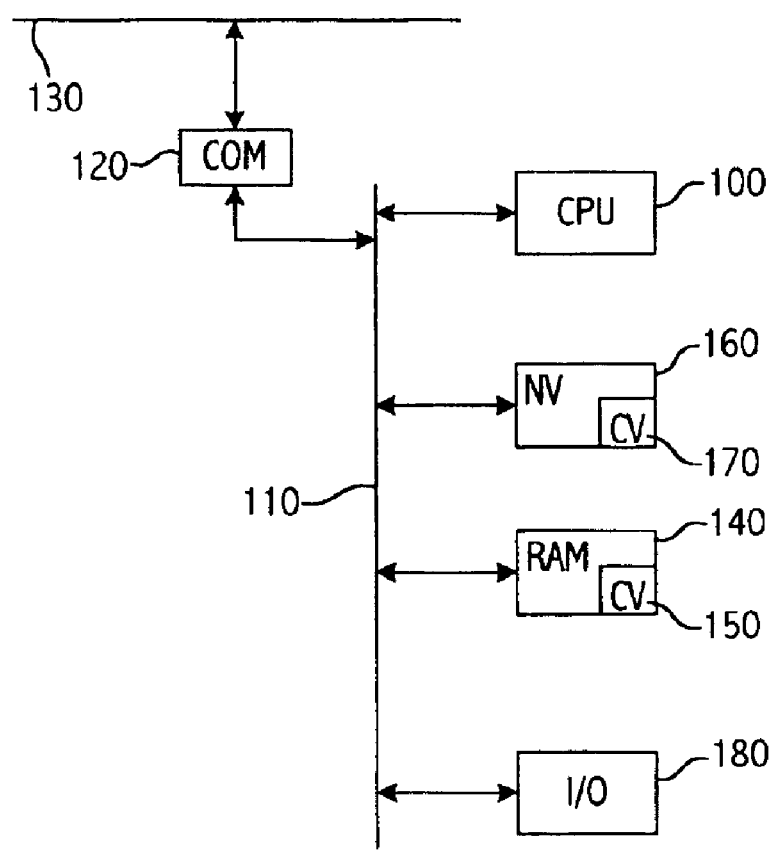
FIG. 1 shows a portion of a computer system.

FIG. 1 shows a portion of a computer system suitable for implementing the present invention. Central processing unit (CPU) 100 communicates along bus 110 with system resources such as communications interface 120 which in turn connects to network 130. CPU 100 also communicates with volatile memory (RAM) 140 which contains currently active counter value 150, and non-volatile memory 160 containing sequence number base value 170. I/O subsystem 180 includes devices such as disk drives, CD ROM drives, keyboards and displays, and the like.

It should be appreciated that the present invention may be practiced on systems of vastly different scales. For example, in a server implementation, CPU 100 could be a Sun SPARC or high-end Intel processor. Communications interface 120 would be an Ethernet interface. Non-volatile memory 140 could be a disk drive or battery-backed memory. At the other end of the spectrum, CPU 100 could be a dedicated processor such as an ARM as is used in handheld devices, communicating with a wired Ethernet interface 120, or a wireless interface 120 such as an 802.11 or Bluetooth interface. Non-volatile memory 140 could be commonly-used EEPROM or Flash.

In protocols using sequence number values, such as the IPSec suite of protocols, monotonically increasing sequence number values are synchronized between sender and receiver, client and server. The last sequence number values must be maintained for comparison to newly received messages. This sequence number value must also be maintained in a non-volatile manner across system failures and restarts.

In large-scale high-performance systems, this non-volatile storage may be provided with battery-backed random access memory (RAM). A secondary level of non-volatile storage may be provided by writing the sequence number values to disk. In smaller systems, such as portable or hand-held devices, non-volatile storage is typically provided by electrically eraseable programmable memory (EEPROM) or FLASH memory. Suitable devices include the 24LC128 Serial EEPROM from Microchip Technology, Inc. The 24LC128 is a 16K by 8-bit serial non-volatile memory. Its use in providing non-volatile storage for sequence number values illustrates the problems posed by such devices.

While read/write times for typical random-access memories (RAM) used in modern computer systems are on the order of tens of nanoseconds, even in hand-held devices, the time required to write information to a device such as the 24LC128 is 5 milliseconds, one hundred thousand times slower than a 50 nanosecond RAM. Read times for EEPROMs and FLASH devices are on the order of tens or hundreds of microseconds.

And while typical RAM systems offer unlimited read-write cycles, EEPROM and FLASH storage systems providing non-volatile storage are characterized for a number of erase/write cycles, typically from the low hundreds of thousands of cycles to a million cycles. So while EEPROM or FLASH memories provide non-volatile storage, they provide it with severe performance penalties and a limited lifetime.

Larger systems as well cannot afford to keep non-volatile copies of sequence counter values on devices such as hard disks, where write times are on the order of milliseconds. Battery-backed memories used for non-volatile storage are typically optimized for low power consumption rather than high performance, and offer access times on the order of microseconds, orders of magnitude slower than main RAM.

Figure 3:
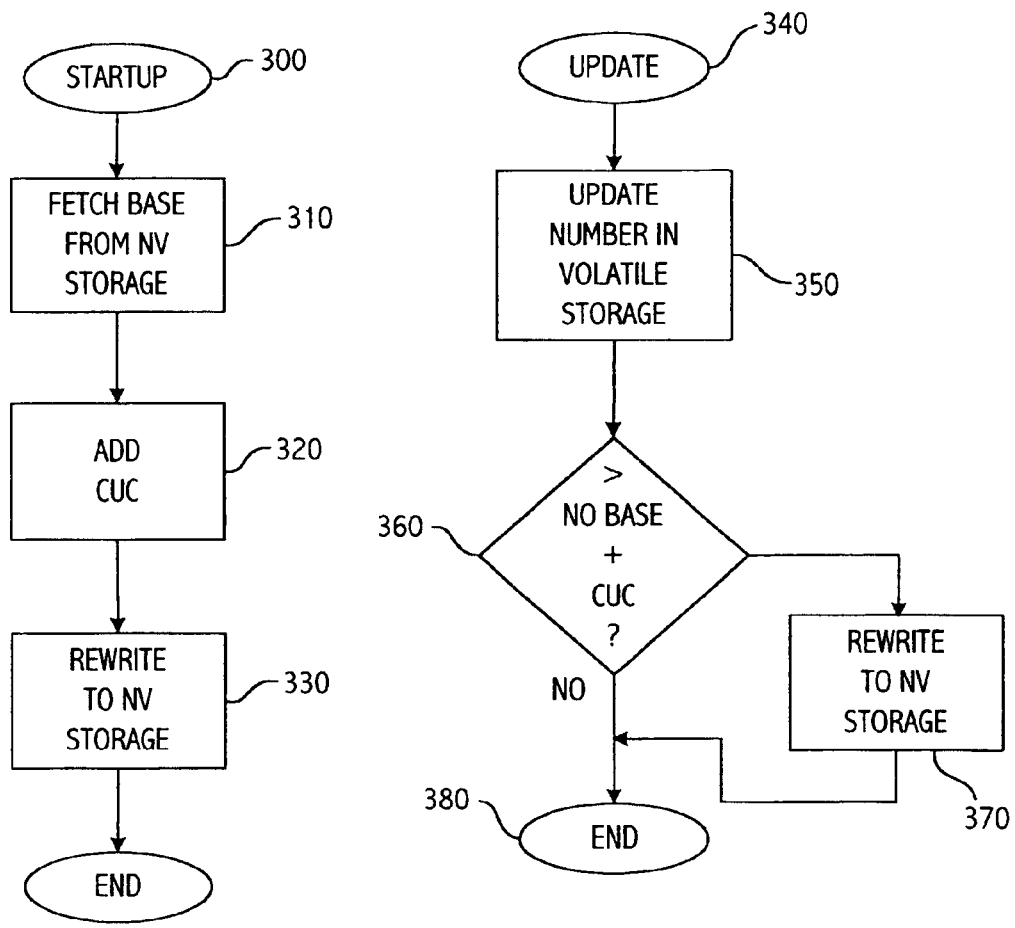
FIG. 3 is a flowchart of one embodiment of the invention.

According to the present invention, writing sequence counter values to non-volatile storage is reduced by writing a sequence number base value to non-volatile storage instead of the currently active count value. During normal operation the system retains the current sequence number in volatile storage and compares each incoming sequence value with the current volatile sequence counter value. FIG. 3 shows the update process 340. The current volatile sequence counter value is updated 350. When the current volatile sequence counter value exceeds the sequence number base value by a predefined counter update constant (CUC) 360, a new sequence number base value is written to non-volatile storage 370.

At system startup, shown as 300 in FIG. 3, the sequence number base value is read 310 from non-volatile storage. In the preferred embodiment, the counter update constant (CUC) is added 320 to form a new sequence number base value in volatile storage, and the resulting sequence number base value written 330 to non-volatile storage as the new sequence number base value. In a first alternate embodiment, the CUC is not added as part of the startup process. In a second alternate embodiment, the CUC is added to the base value in volatile storage, but this new value is not written back to non-volatile storage as part of the startup process, relying instead on the update process to write to nonvolatile storage when it is first called.

If a valid previous sequence number base value was not present in non-volatile storage, a preset value such as 00 is used for the initial value. By adding the CUC at startup to form a new sequence number base value, the system insures that the next sequence number value used is always greater than the last known sequence number value used. Detecting an invalid previous sequence number value stored in non-volatile memory may be accomplished using known techniques such as verifying a check byte such as a flag, checksum, or CRC stored with the value, or by detecting an initial pattern presented by an unprogrammed device, such as all ones or all zeroes.

As a first example, node A in a communications protocol uses FLASH memory for non-volatile storage and uses the present invention to reduce the number of writes to non-volatile storage. In this example, node A initiates communications with server node B, using a protocol which requires node A to supply a monotonically increasing sequence number value to server B. Server B checks each message sequence number value to verify that it is greater than the previously received sequence number value and updates its database with the new sequence number. Assume node A has a sequence number base value of 00 stored in its non-volatile memory, and a counter update constant (CUC) value of 16384. Also assume both nodes A and B have a currently active counter value of 400.

Figure 2:
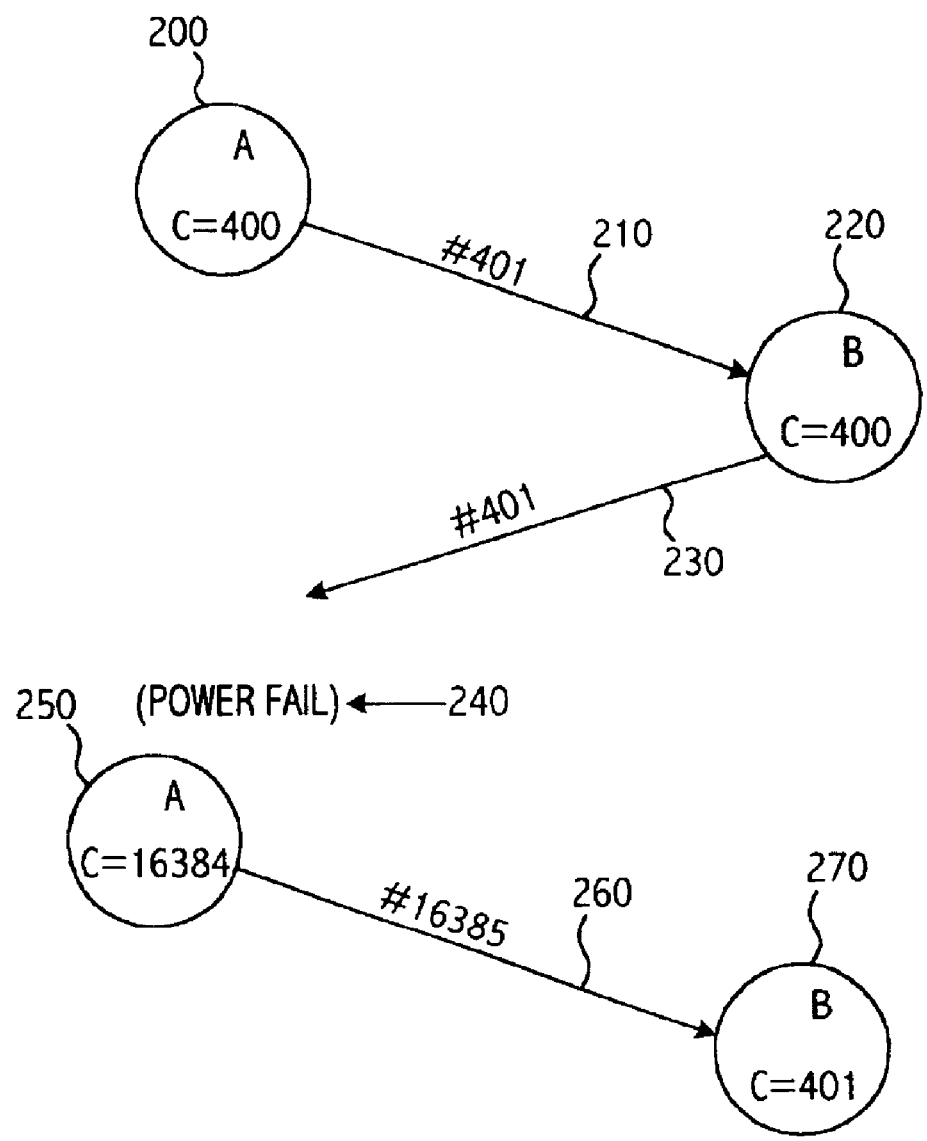
FIG. 2 shows a communications exchange using sequence numbers.

Referring now to FIG. 2, at 200, node A with currently active counter value 400 sends message #401, shown as 210. At 220, node B with currently active counter value 400 receives message #401, accepting it as valid as its sequence number value, 401, is greater than node B's currently active counter value of 400. Node B sets its currently active counter value to 401 and sends message 230 with sequence number #401 to node A.

At 240, node A experiences a power failure. Recovering from this power failure, node A takes its sequence number base value stored in non-volatile memory, which is zero, adds the CUC value of 16384 to form a new current active counter value, and stores this new current active counter value in non-volatile memory. At 250, node A with current active counter value 16384 sends message 260 with sequence number #16385 to node B. At 270, node B receives the message with sequence number #16385 and accepts it, since 16385 is greater than its current active counter value of 401. Node B updates its current active counter value to 16385.

When both sides of the communications channel implement the present invention, or both sides may initiate communication, additional logic is needed to recover when one side restarts. To illustrate this problem, consider the following case where server node B initiates a message to client node A after node A reboots. Again, assume node A has a sequence number base value of 00 stored in its non-volatile memory, and a counter update constant (CUC) value of 16384. Also assume both nodes A and B have a currently active counter value of 400.

1. A sends message #401 to B
2. B accepts A's message #401 as valid and updates its counter to 401.
3. B sends message #401 to A.
4. A restarts after a power failure.
5. A forms new currently active counter value of 16384.
6. B sends A message #402
7. A rejects B's message as being less than 16384.

While message #402 is valid from B's perspective, the message is rejected by A. In this case node A must advise node B that the message was rejected due to an invalid sequence number. The sequence then becomes the following:

1. A sends message #401 to B
2. B accepts A's message #401 as valid and updates its counter to 401.
3. B sends message #401 to A.
4. A restarts after a power failure.
5. A forms new currently active counter value of 16384.
6. B sends A message #402
7. A rejects B's message as being less than 16384.
8. A sends message #16385 to B, "message rejected."

9. B accepts message #16385, since it is greater than 402.

10. B updates its currently active counter value to 16385

11. B resends message #402 using message #16386.

12. A accepts message #16386.

Note that in step 8 above, node A sends a message rejected response with its next message number. The message rejected response may contain additional information, such as its currently active counter value, for example sending "message rejected, sequence number must be >16385." This information may be passed explicitly for use by node B in step 9 above, or node B may infer this value from the sequence number contained in the message, in this case, #16385.

This modified embodiment also allows the use of separate sequence numbers for sending as well as receiving.

The invention may also be used for one-way communications, for example in a device which only sends information. In such a device, a base value kept in non-volatile storage is copied to volatile storage and used as the current sequence number value in the communications protocol. When the current sequence number in volatile storage exceeds the base value by the predefined counter update constant, the current sequence number is written to non-volatile storage as the new sequence number base value.

The invention may also be applied to using disk storage as non-volatile storage for sequence number values. While disk storage is readily available on computer systems, this approach incurs penalties in both performance and in system reliability. Writing information to disk incurs performance penalties, both in the time required to complete the operation, and in the bandwidth consumed in the disk channel which increases the time required to process other disk requests. Overall system reliability may suffer as well, as increasing the number of writes to a disk increases the time during which a power failure or system restart may result in data loss or corruption on the disk. According to the present invention, current sequence numbers are kept in volatile storage, and updated according to the protocols in use. When the current volatile sequence counter value exceeds the sequence number base value by the predefined counter update constant (CUC), the current sequence number is written to non-volatile storage as the new sequence number base value.

The methods described may be used with sequence numbers unique to each message, or it may be used with sequence numbers which identify a transaction that may span multiple messages.

The foregoing detailed description of the present invention is provided for the purpose of illustration and is not intended to be exhaustive or to limit the invention to the precise embodiments disclosed. Accordingly the scope of the present invention is defined by the appended claims.

We claim:

1. In a system for tracking sequence numbers in a communications protocol, the method of tracking the sequence numbers in non-volatile memory comprising:

initializing a sequence number in volatile memory from the sequence number stored in non-volatile memory, updating the sequence number in volatile memory, and updating the sequence number in non-volatile memory when the sequence number in volatile memory exceeds the sequence number in non-volatile memory by a predetermined update value.

2. The method of claim 1 where the step of initializing the sequence number in volatile memory comprises copying the sequence number from non-volatile memory to volatile memory.

3. The method of claim 1 where the step of initializing the sequence number in volatile memory comprises the steps of:

copying the sequence number from non-volatile memory to volatile memory, and adding the predetermined update value to the sequence number in volatile memory to form a new sequence number in volatile memory.

4. The method of claim 1 where the step of initializing the sequence number in volatile memory comprises the steps of:

copying the sequence number from non-volatile memory to volatile memory, adding the predetermined update value to the sequence number in volatile memory to form a new sequence number in volatile memory, and writing the new sequence number in volatile memory to non-volatile memory.

5. The method of claim 1 where the sequence number in volatile memory is updated in a monotonic fashion.

6. The method of claim 5 where the sequence number is updated on a per-message basis.

7. The method of claim 5 where the sequence number is updated on a per-transaction basis, the transaction spanning one or more messages.

8. A computer readable medium that includes executable instructions for processing sequence number information used in communications protocols, said computer readable medium comprising:

code for initializing a sequence number in a volatile memory from a sequence number stored in a non-volatile memory, code for updating the sequence number in the volatile memory, and code for updating the sequence number in the non-volatile memory when the sequence number in the volatile memory exceeds the sequence number in the non-volatile memory by a predetermined update value.

9. The computer readable medium of claim 8 where the code for initializing the sequence number in a volatile memory further comprises:

code for copying the sequence number from the non-volatile memory to the volatile memory, code for adding the predetermined update value to the sequence number in the volatile memory to form a new sequence number in the volatile memory, and code for writing the new sequence number in the volatile memory to the non-volatile memory.

10. The computer readable medium of claim 8 where the code for updating the sequence number in the volatile memory updates the sequence number in the volatile memory in a monotonic fashion.

11. The computer readable medium of claim 10 where the code for updating the sequence number in the volatile memory updates the sequence number in the volatile memory on a per-message basis.

12. The computer readable medium of claim 10 where the code for updating the sequence number in the volatile memory updates the sequence number in the volatile memory on a per-transaction basis, the transaction spanning one or more messages.

* * * * *